May 28, 1929. H. W. HOUCK 1,715,319
ADJUSTABLE ELECTRICAL CONDENSER
Filed Oct. 7, 1924
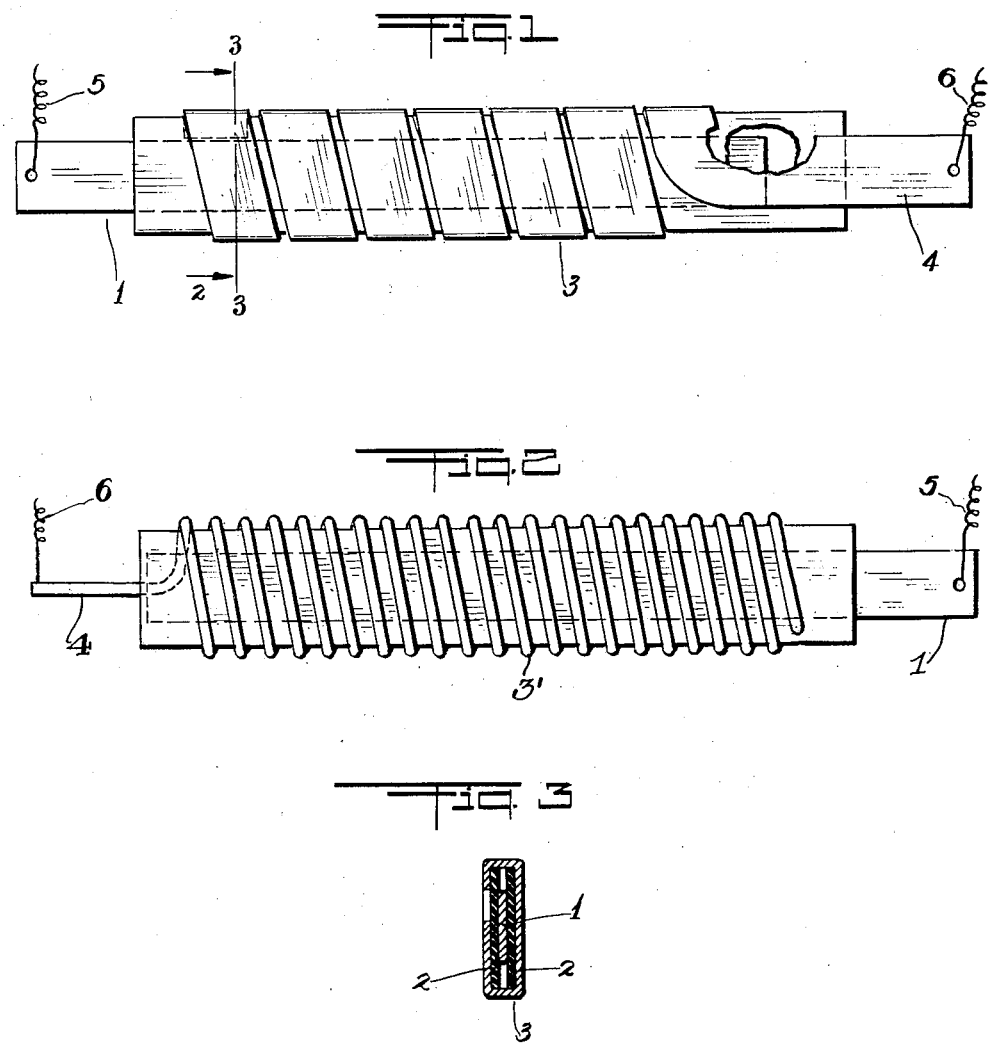

Patented May 28, 1929.

1,715,319

UNITED STATES PATENT OFFICE.

HARRY W. HOUCK, OF EAST ORANGE, NEW JERSEY, ASSIGNOR TO DUBILIER CONDENSER CORPORATION, OF NEW YORK, N. Y., A CORPORATION OF DELAWARE.

ADJUSTABLE ELECTRICAL CONDENSER.

Application filed October 7, 1924. Serial No. 742,224.

The invention relates to an improved electrical condenser, particularly an electrical condenser of variable capacity.

An object of the invention is to provide a condenser that can be easily and inexpensively produced, and that is simple and homogeneous in structure, and capable of variation in capacity to an exceedingly accurate degree.

Further advantages of my improvements will appear from the following description and drawings, which illustrate one or more preferred forms of my invention; and I, of course, reserve the right to make any alterations of structure that are embraced within the scope and spirit of the invention as defined in the appended claims.

On the drawings, Figure 1 is a top view of a condenser according to my invention.

Figure 2 is a similar view of another such condenser; and

Figure 3 is a section on the line 3—3 of Figure 1.

The same numerals identify the same parts throughout.

The numeral 1 in Figures 1 and 3 indicates an electrical conductor, which may be a flat strip of copper, or any other electrically conductive material, and of the required size. This conductor is covered with insulation 2 of any suitable character and thickness, and around the outside of the insulation is wrapped a flat strip 3 of conductive material, which encircles the insulation 2, enveloping the conductor 1 with a number of spirals from one end of the insulation to the other. The insulation 2 as shown consists of a pair of plates of greater width than the strip 1, and laid against the opposite faces of this strip; and held in place by the turns of the strip 3 wrapped tightly around. The plates 2 must overlap the lateral edges of the strip 1 to prevent actual contact between this strip and the strip 3. If required, the insulation may be made to encircle the strip 1 and cover the longitudinal edges also.

This device forms a condenser because it comprises two parts or elements of conductive material 1 and 3 separated by a dielectric 2; the conductor 3 can be wound as closely as one wishes on the insulation 2 and the turns or spirals of this strip 3 may even be in contact with one another.

In practice, this condenser may be employed in radio apparatus and other electrical circuits and it can be made of any length or capacity. The longer the length of the condenser, the greater the capacity; and if varying capacities are desired, one needs only to unwrap the end 4 of the strip 3 from around the insulation 2, in greater or less degree, or wrap it further around the insulation, to afford the capacity needed for any particular purpose or under any particular set of conditions. With this condenser the capacity can always be adjusted with the greatest accuracy and fineness.

Figure 2 illustrates a similar condenser, with a length of ordinary electric wire 3′, substituted for the strip 3. The mode of use and adjustment is the same as before. One element 1 can be connected to an electrical circuit through a conductor 5 and the other element joined to the opposite terminal of the circuit through a conductor 6.

Having described my invention, what I believe to be new and desire to secure and protect by Letters Patent of the United States is:

1. An electrical condenser comprising an elongated strip of conductive material, a plurality of insulating plates, certain of the plates arranged on each side of said strip, and extending beyond the lateral edges, and a second strip of conductive material adjustably wound upon said insulation and progressively along said insulation and said strip, to enable the capacity of the condenser to be varied.

2. An electrical condenser comprising an elongated flat strip of conductive material, two insulating plates one on each side of said strip and extending beyond the lateral edges thereof, and a second flat strip adjustably wound over said insulation and progressively along said insulation and said first-named strip to enable the capacity of the condenser to be varied.

3. An electrical condenser comprising an elongated flat strip of conductive material, two insulating plates one on each side of said strip, and projecting beyond the lateral faces thereof and an electrical wire adjustably wound over the insulation and progressively along said insulation and said strip for the purpose set forth.

4. An electrical condenser comprising an elongated conductive element, plates of insulation arranged along opposite sides of the same, and a conductive element wound upon the first-named conductive element, and insulation, in spiral turns along the length of said first-named conductive element, said turns being separated to avoid overlapping, said wound conductive element permitting the capacity of the condenser to be varied.

Signed at New York in the county of New York and State of New York this 6th day of October, A. D. 1924.

HARRY W. HOUCK.